(12) United States Patent
Keshavan et al.

(10) Patent No.: US 10,496,767 B1
(45) Date of Patent: Dec. 3, 2019

(54) SYSTEM AND METHOD FOR ENHANCED CHARACTERIZATION FOR SYSTEM IDENTIFICATION OF NON-LINEAR SYSTEMS

(71) Applicant: Cadence Design Systems, Inc., San Jose, CA (US)

(72) Inventors: Kumar Chidhambara Keshavan, Medford, MA (US); Ambrish Kant Varma, Chelmsford, MA (US); Hui Qi, Shanghai (CN); Kenneth Robert Willis, Matthews, NC (US); Xuegang Zeng, Westborough, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 570 days.

(21) Appl. No.: 15/201,968

(22) Filed: Jul. 5, 2016

(51) Int. Cl.
  *G06F 17/50* (2006.01)
  *G06F 11/07* (2006.01)
  *G06F 21/51* (2013.01)

(52) U.S. Cl.
  CPC ...... *G06F 17/5009* (2013.01); *G06F 17/5022* (2013.01); *G06F 17/5045* (2013.01); *G06F 11/0784* (2013.01); *G06F 17/5081* (2013.01); *G06F 21/51* (2013.01)

(58) Field of Classification Search
  None
  See application file for complete search history.

(56) References Cited

U.S. PATENT DOCUMENTS

| | | | |
|---|---|---|---|
| 6,378,123 B1 * | 4/2002 | Dupenloup | G06F 17/5045 716/104 |
| 6,940,829 B2 * | 9/2005 | Walles | H04B 3/23 370/286 |
| 7,082,584 B2 * | 7/2006 | Lahner | G06F 17/5022 716/102 |
| 7,627,463 B2 | 12/2009 | Chidhambarakrishnan | |
| 8,052,611 B2 * | 11/2011 | Wariar | A61B 5/0031 600/508 |
| 8,745,567 B1 * | 6/2014 | Varadrajan | G06F 17/504 716/101 |
| 8,782,582 B1 * | 7/2014 | Gupta | G06F 17/5081 716/106 |
| 9,785,141 B2 * | 10/2017 | Tripathi | G05B 19/418 |
| 9,836,565 B2 * | 12/2017 | Kang | G06F 17/5022 |
| 2002/0077809 A1 * | 6/2002 | Walles | H04B 3/23 704/201 |
| 2006/0064656 A1 * | 3/2006 | Lakshmanan | G06F 17/5081 716/112 |

(Continued)

*Primary Examiner* — Kibrom K Gebresilassie
(74) *Attorney, Agent, or Firm* — Mark H. Whittenberger, Esq.; Holland & Knight LLP

(57) ABSTRACT

The present disclosure relates to non-linear systems associated with an electronic circuit design. Embodiments may include identifying the non-linear system associated with the electronic circuit design and determining a degree of severity of non-linearity of the non-linear system associated with the electronic circuit design. If the degree of severity is less than a predefined threshold, embodiments may further include receiving a random input pattern and deriving a single impulse response characterization, wherein the random input pattern is based upon, at least in part, an electronic circuit simulation associated with the electronic circuit design.

17 Claims, 8 Drawing Sheets

(56) References Cited

U.S. PATENT DOCUMENTS

| | | | |
|---|---|---|---|
| 2008/0228090 A1* | 9/2008 | Wariar | A61B 5/0031 600/508 |
| 2013/0125072 A1* | 5/2013 | Newcomb | G06F 17/5081 716/107 |
| 2014/0029932 A1* | 1/2014 | Randel | G01M 11/3118 398/13 |
| 2015/0346066 A1* | 12/2015 | Dutta | G01M 99/008 702/183 |

* cited by examiner

SYSTEM AND METHOD FOR ENHANCED CHARACTERIZATION FOR SYSTEM IDENTIFICATION OF NON-LINEAR SYSTEMS

FIELD OF THE INVENTION

The present disclosure relates to techniques for system identification of non-linear systems.

DISCUSSION OF THE RELATED ART

Electronic design automation (EDA) utilizes software tools that may be used in the design and analysis of numerous electronic systems such as printed circuit boards (PCBs) and integrated circuits (ICs). In the context of EDA, characterizations capture the electrical behavior of a system. Simulation results depend on the accuracy of these characterizations.

Existing techniques extract the system characterization using a single step response (e.g., rising or falling). This approach is effective for linear time invariant ("LTI") systems. This method is rudimentary and has accuracy problems for complex non-linear systems as the user is restricted to generating characterizations for only rising or falling steps.

SUMMARY

In one or more embodiments of the present disclosure, a computer-implemented method for use in a non-linear system associated with an electronic circuit design is provided. The method may include identifying the non-linear system associated with the electronic circuit design and determining a degree of severity of non-linearity of the non-linear system associated with the electronic circuit design. If the degree of severity is less than a predefined threshold, the method may include receiving a random input pattern and deriving a single impulse response characterization, wherein the random input pattern is based upon, at least in part, an electronic circuit simulation associated with the electronic circuit design.

One or more of the following features may be included. In some embodiments, if the degree of severity is higher than a predefined threshold, the method may include receiving a random input stream having a plurality of patterns and deriving multiple pattern-dependent impulse response characterizations. The multiple pattern-dependent impulse response characterizations may be automatically generated for all prior combinations of bits. The method may include providing the multiple pattern-dependent impulse response characterizations to one or more algorithmic modeling interface ("AMI") models associated with an electronic design application. The one or more AMI models may be used with an Input/output Buffer Information Specification ("IBIS") specification compliant simulator. The method may include generating a channel simulation waveform. The random input pattern may be a pseudorandom binary sequence ("PRBS").

In some embodiments, a computer-readable storage medium having stored thereon instructions that when executed by a machine result in one or more operations is provided. Operations may include identifying a non-linear system associated with the electronic circuit design and determining a degree of severity of non-linearity of the non-linear system associated with the electronic circuit design. If the degree of severity is less than a predefined threshold, operations may include receiving a random input pattern and deriving a single impulse response characterization, wherein the random input pattern is based upon, at least in part, an electronic circuit simulation associated with the electronic circuit design.

One or more of the following features may be included. In some embodiments, if the degree of severity is higher than a predefined threshold, operations may include receiving a random input stream having a plurality of patterns and deriving multiple pattern-dependent impulse response characterizations. The multiple pattern-dependent impulse response characterizations may be automatically generated for all prior combinations of bits. Operations may include providing the multiple pattern-dependent impulse response characterizations to one or more algorithmic modeling interface ("AMI") models associated with an electronic design application. The one or more AMI models may be used with an Input/output Buffer Information Specification ("IBIS") specification compliant simulator. Operations may include generating a channel simulation waveform. The random input pattern may be a pseudorandom binary sequence ("PRBS").

In one or more embodiments of the present disclosure, a system for use in a non-linear system associated with an electronic circuit design is provided. The system may include a computing device configured to identify the non-linear system associated with the electronic circuit design and to determine a degree of severity of non-linearity of the non-linear system associated with the electronic circuit design. If the degree of severity is less than a predefined threshold, the system may be further configured to receive a random input pattern and deriving a single impulse response characterization, wherein the random input pattern is based upon, at least in part, an electronic circuit simulation associated with the electronic circuit design.

One or more of the following features may be included. In some embodiments, if the degree of severity is higher than a predefined threshold, the system may be further configured to receive a random input stream having a plurality of patterns and deriving multiple pattern-dependent impulse response characterizations. The multiple pattern-dependent impulse response characterizations may be automatically generated for all prior combinations of bits. The system may be further configured to provide the multiple pattern-dependent impulse response characterizations to one or more algorithmic modeling interface ("AMI") models associated with an electronic design application. The one or more AMI models may be used with an Input/output Buffer Information Specification ("IBIS") specification compliant simulator. The system may be further configured to generate a channel simulation waveform. The random input pattern may be a pseudorandom binary sequence ("PRBS").

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
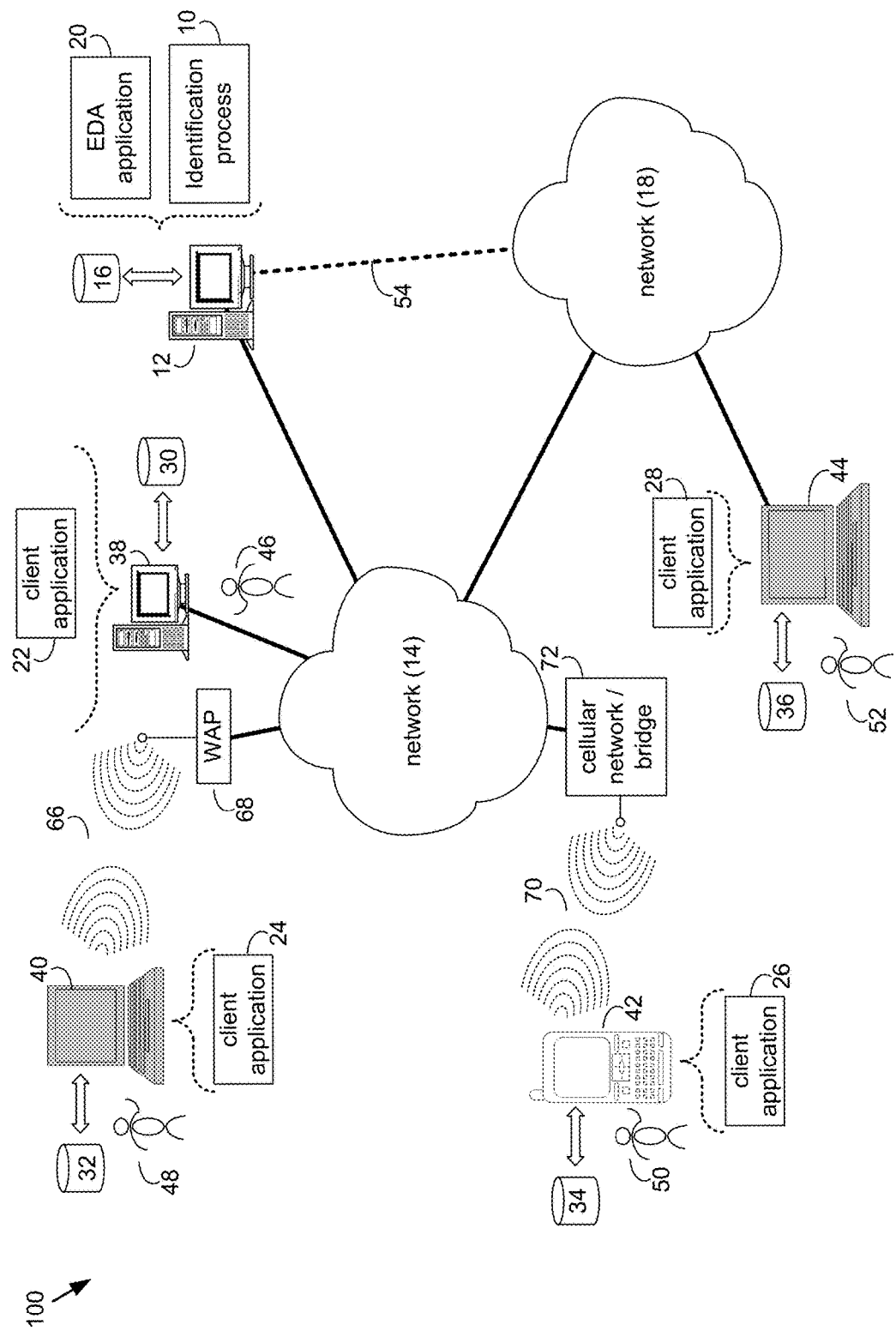
FIG. 1 is a system diagram depicting aspects of the identification process in accordance with an embodiment of the present disclosure.

Referring now to FIGS. 1-8, embodiments of the present disclosure relate to a system and method for enhanced characterization for system identification of non-linear systems. Embodiments described herein may include identifying the non-linear system associated with an electronic circuit design and determining a degree of severity of non-linearity of the non-linear system associated with the electronic circuit design. If the degree of severity is less than a predefined threshold, embodiments may include receiving a random input pattern and deriving a single impulse response characterization. In some embodiments, the random input pattern may be based upon, at least in part, an electronic circuit simulation associated with the electronic circuit design. It should be noted that embodiments discussed below may make reference to an identification process that may be used in accordance with an EDA application. These examples are merely provided by way of example as the teachings of the present disclosure may be employed in any suitable context and/or application.

Additional information pertaining to characterization techniques and processes may be found, for example, in U.S. Pat. No. 7,627,463, which is available from the Assignee of the present disclosure and is hereby incorporated by reference in its entirety.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown an identification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the identification process may reside on and be executed, in whole or in part, by a client electronic device, such as a personal computer, notebook computer, personal digital assistant, or the like.

The instruction sets and subroutines of identification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files, etc.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Identification process 10 may be a stand alone application, or may be an applet/application/script that may interact with and/or be executed within EDA application 20. In addition/as an alternative to being a server-side process, the identification process may be a client-side process (not shown) that may reside on a client electronic device (described below) and may interact with an EDA client application (e.g., one or more of EDA client applications 22, 24, 26, 28). Further, the identification process may be a hybrid server-side/client-side process that may interact with EDA application 20 and an EDA client application (e.g., one or more of client applications 22, 24, 26, 28). As such, the identification process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize identification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
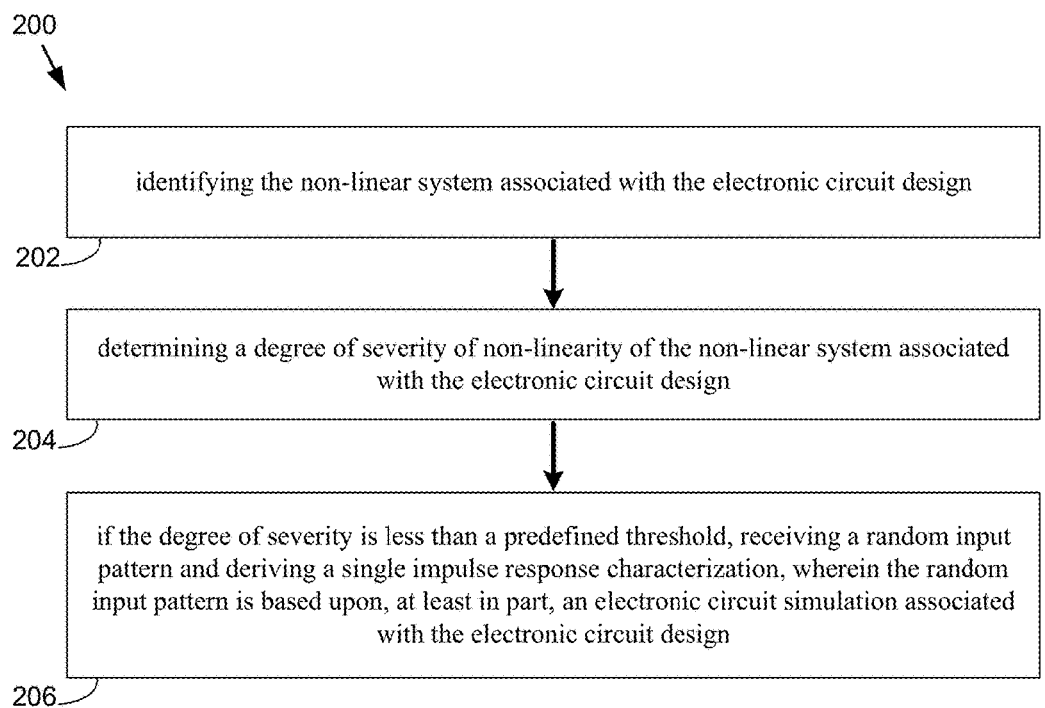
FIG. 2 is a flowchart depicting operations consistent with the identification process of the present disclosure.

Referring now to FIG. 2, embodiments of identification process 10 may include identifying (202) the non-linear system associated with the electronic circuit design and determining (204) a degree of severity of non-linearity of the non-linear system associated with the electronic circuit design. If the degree of severity is less than a predefined threshold, embodiments may include receiving (206) a random input pattern and deriving a single impulse response characterization, wherein the random input pattern is based upon, at least in part, an electronic circuit simulation associated with the electronic circuit design. Each of these operations is discussed in further detail herein below.

Figure 3:
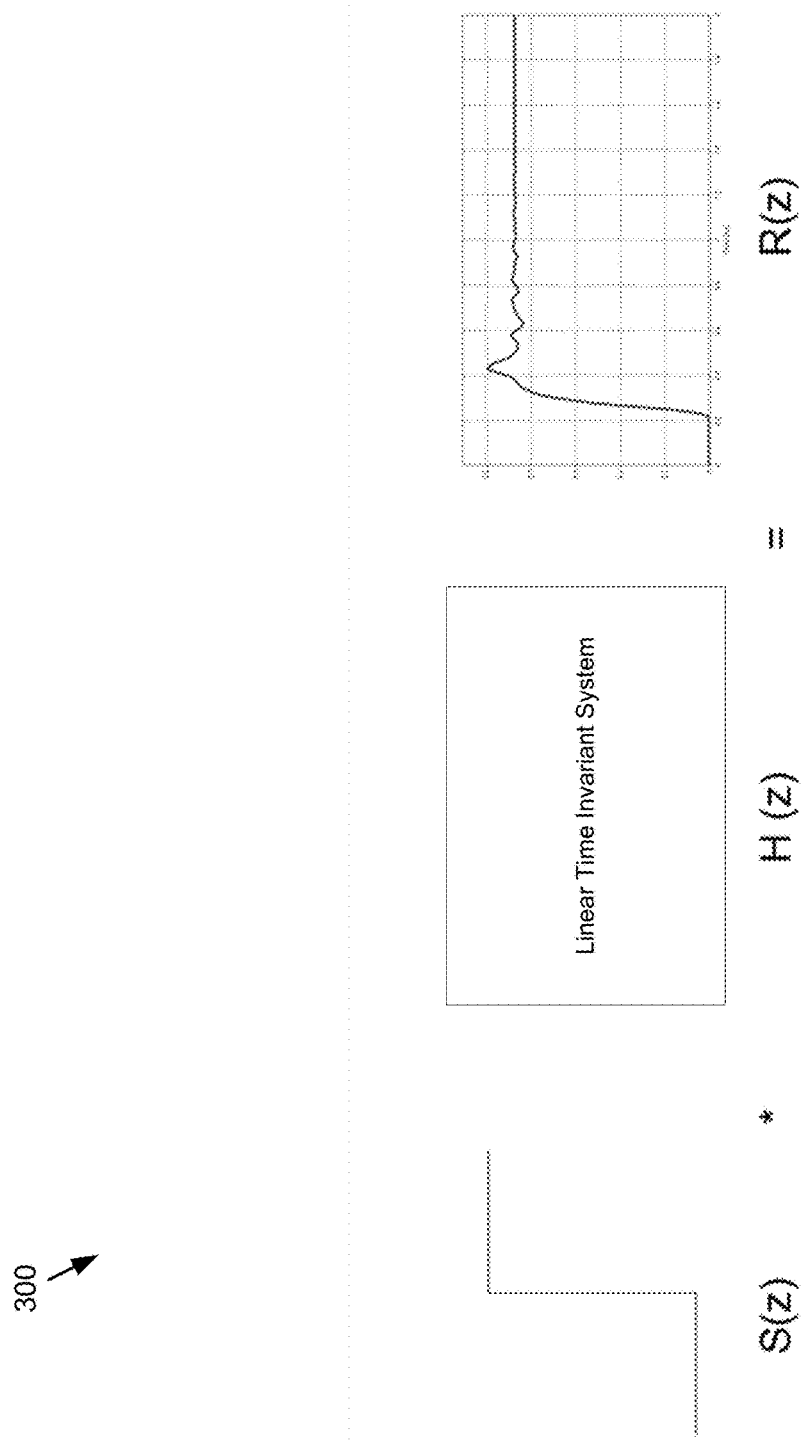
FIG. 3 is a diagram depicting aspects of the identification process in accordance with an embodiment of the present disclosure.

Referring now to FIG. 3, a schematic 300 depicting a linear system using existing approaches is provided. In this particular example, H(z) is the impulse response of the system, S(z) is the input wave, and R(z) is the system response in a uniformly sampled system. Currently, for linear systems it is possible to derive the Impulse Response Characterization from the step response by differentiating it with respect to time. However, this method is only valid for Linear-Time Invariant ("LTI") systems as only one step response is generated from one input step, which is insufficient to capture any non-linear and time variant effects.

Figure 4:
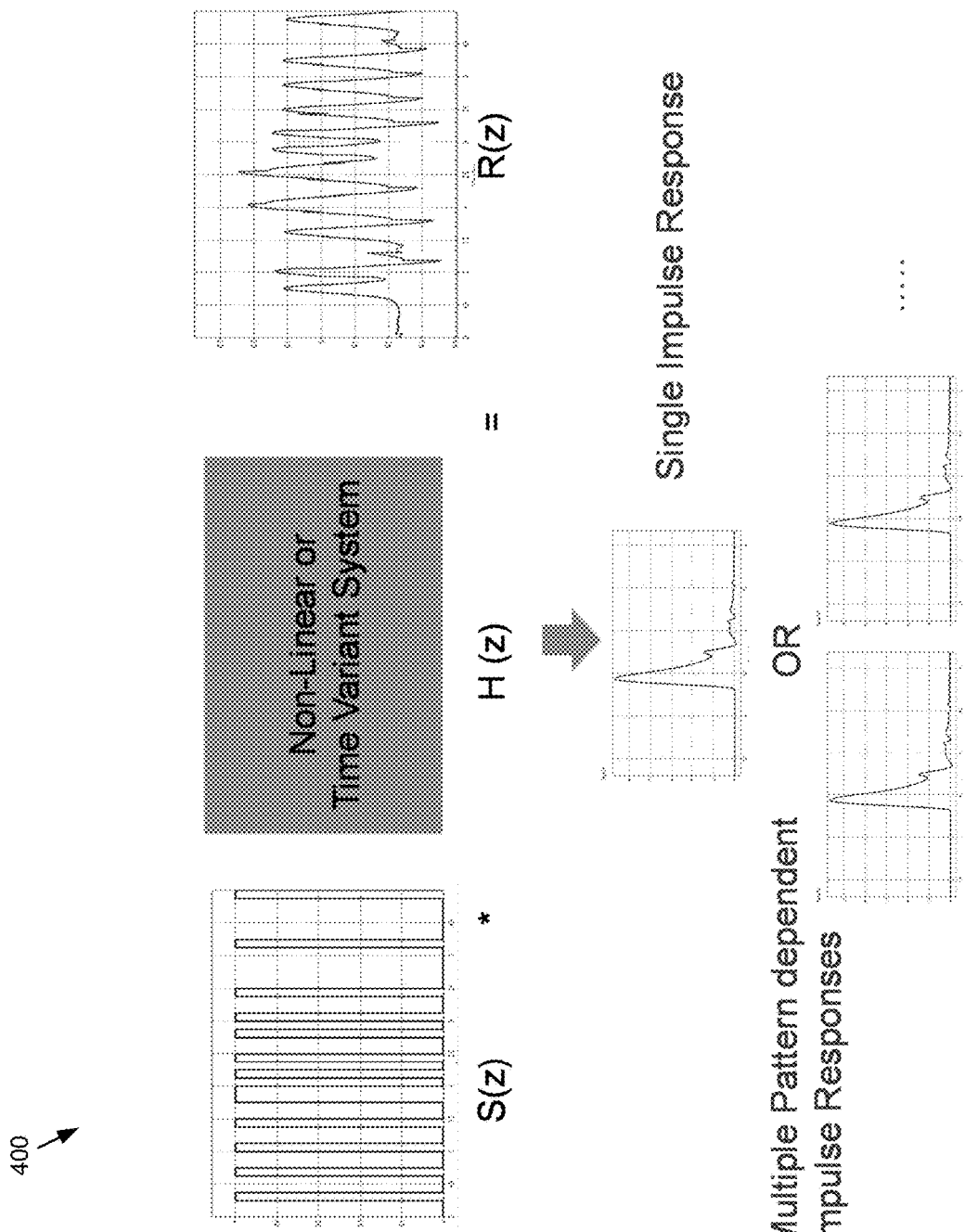
FIG. 4 is a diagram depicting aspects of the identification process in accordance with an embodiment of the present disclosure.
Figure 5:
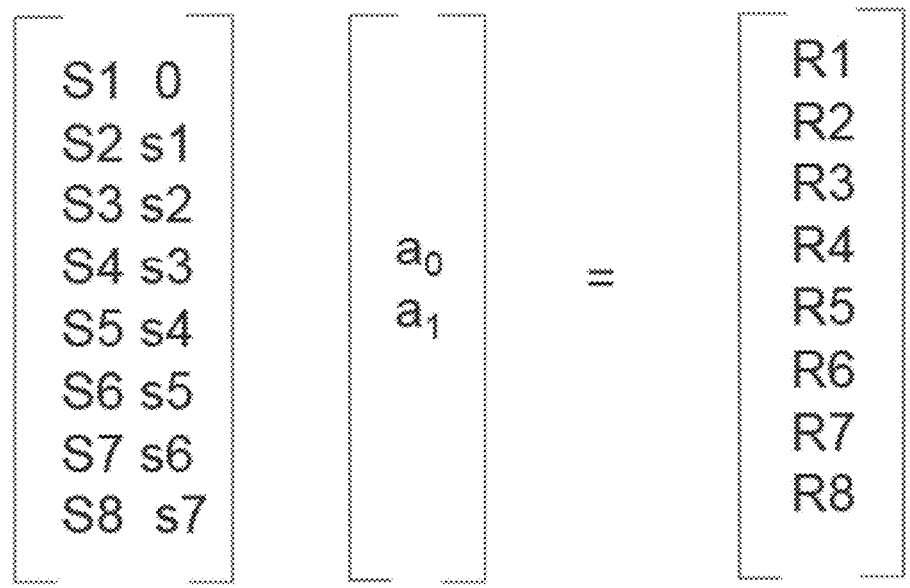
FIG. 5 is a diagram depicting aspects of the identification process in accordance with an embodiment of the present disclosure.

Accordingly, embodiments of identification process 10 may provide a method for enhanced characterization for waveform and system identification. Referring now to FIG. 4, a schematic 400 depicting an embodiment consistent with the teachings of the present disclosure is provided. In this particular example, S(z)*H(z)=R(z) where S(z) is the random input waveform. In some embodiments, the random input waveform may be arbitrary and may include a pseudorandom binary sequence ("PRBS"). $H(z) = S_M \, a_i * z^{-i} / S_N \, b_i * z^{-i}$ is the transfer function of the system to be characterized. Here, $Sa_i$ are the numerator coefficients and $Sb_i$ are denominator coefficients where numerator goes from 0 to M and denominator goes from 0 to N. The number of unknowns=M+N−1.

In one particular example, S and R are 8 point wave from (e.g., 8 samples), the numerator order=2 and the denominator order is 1 with $b_0=1$. The number of unknown=2+1−1=2, S (Input wave)=[s1 s2 s3 s4 s5 s6 s7 s8] and R (Output wave)=[r1 r2 r3 r4 r5 r6 r7 r8]. A matrix corresponding to Num (2)/Den (0) is provided in FIG. 5. Some embodiments may include solving for $a_0$ and $a_1$ by using the standard Least Mean Square error ("LMS") algorithm or any other suitable approach.

Figure 6:
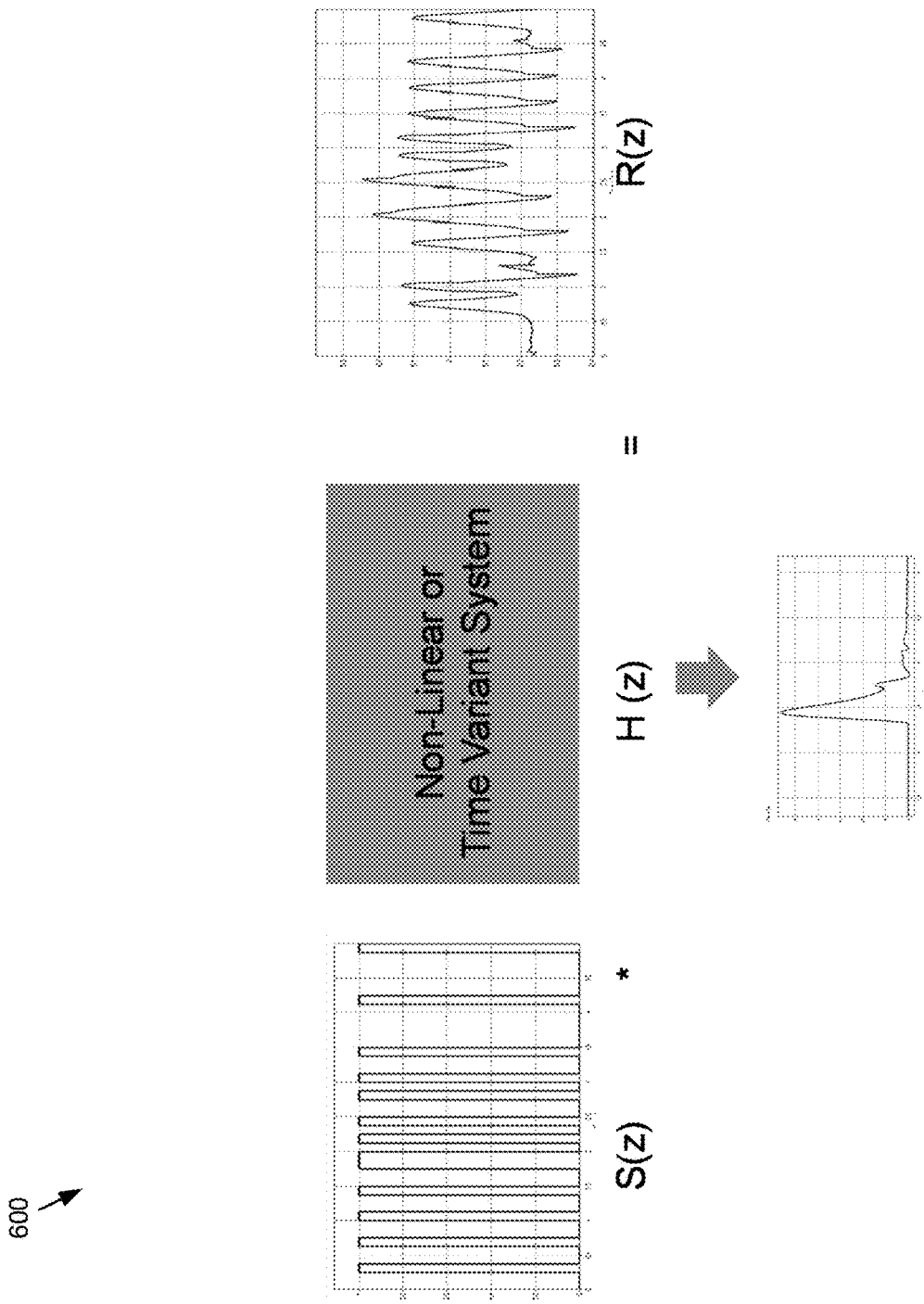
FIG. 6 is a diagram depicting aspects of the identification process in accordance with an embodiment of the present disclosure.

Referring also to FIG. 6, an embodiment depicting a schematic consistent with identification process 10 is provided. As is shown in the Figure, embodiments may include providing a random input pattern and deriving a single characterization therefrom. In some embodiments, this ramp or impulse response may capture a more accurate signature of a non-LTI system. In some embodiments, identification process 10 may include determining a degree of severity of non-linearity of the non-linear system associated with the electronic circuit design. If the degree of severity is less than a predefined threshold, embodiments may include receiving a random input pattern and deriving a single impulse response characterization, wherein the random input pattern is based upon, at least in part, an electronic circuit simulation associated with the electronic circuit design.

In some embodiments, the original waveform may correspond to all or a portion of a circuit simulation. This may be compared with what was produced, for example, a channel simulation waveform such as those described in U.S. Pat. No. 7,627,463 discussed above.

In contrast, if the degree of severity of non-linearity is above the predefined threshold, embodiments may include deriving multiple pattern-dependent impulse responses. In some embodiments, the random input stream may consist of many different patterns. Each transition will behave differently based on the previous bits due to inter-symbol-interference ("ISI"), non-linear, non-LTI effects, etc. In some embodiments, impulse responses may be automatically generated for all prior combination of bits. For example, if a user wants to generate a three bit (transition+2 previous bits) impulse response, 4 different impulse responses may be automatically generated (e.g., 010, 101, 110, 001). It should be noted that these impulse responses are likely to be more accurate than a single impulse response for a non-linear, time variant system.

Figure 7:
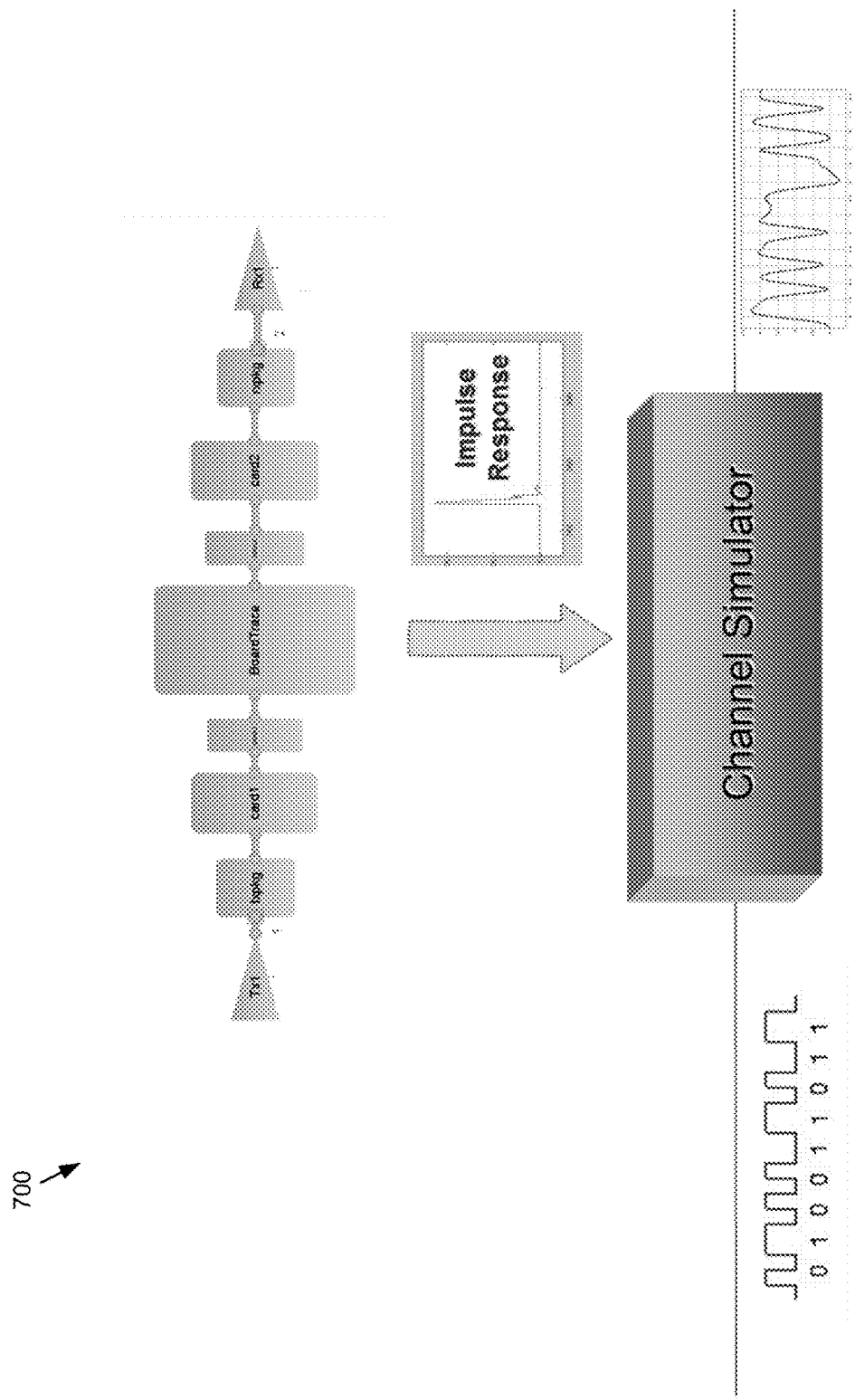
FIG. 7 is a diagram depicting aspects of the identification process in accordance with an embodiment of the present disclosure.

Referring now to FIG. 7, a schematic 700 depicting an embodiment consistent with identification process 10 is provided. Embodiments of identification process 10 may allow for the usage of multiple pattern-dependent impulse responses in AMI models for system level simulation in accordance with any commercially available EDA tool. Traditionally, AMI models only accept only one single characterization.

Figure 8:
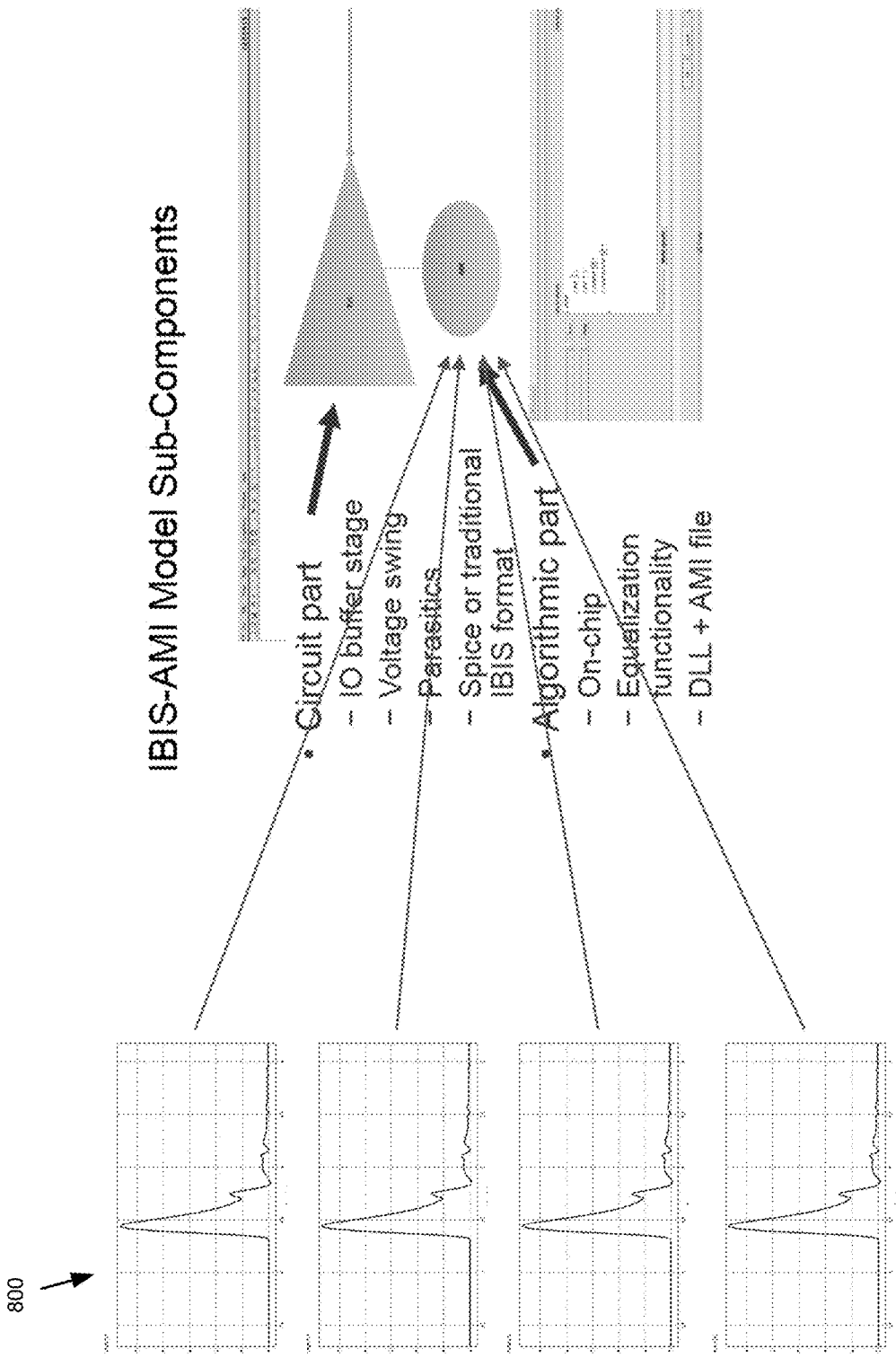
FIG. 8 is a diagram depicting aspects of the identification process in accordance with an embodiment of the present disclosure.

Referring also to FIG. 8, another embodiment depicting a schematic 800 consistent with the teachings of the present disclosure is provided. In this particular example, identification process 10 may allow for the use of multiple impulse responses in AMI models for high throughput simulations. These AMI models may be run in any simulator, some of which may include, but are not limited to, IBIS specification compliant simulators.

As discussed above, embodiments of the identification process 10 described herein are directed towards systems and methods for enhanced characterization for system identification of non-linear systems. In some embodiments, identification process 10 may be configured to provide generalized system characterizations based on arbitrary waveforms. Embodiments may further include the automatic extraction of multiple impulse responses from one random waveform based on previous bits and/or the extraction of a characteristic impulse response from the entire waveform. Accordingly, identification process 10 may allow for the application of the impulse response for multi-gigabit channel simulation techniques for any electrical interconnect system using AMI models.

Existing approaches involve extracting the system characterization using a single step response (e.g., rising or falling). This method works for linear time invariant ("LTI") systems. However, this method is overly simplistic and has accuracy concerns for complex systems. For example, this method has accuracy issues if the system is non-LTI or non-linear as the user is restricted to generating characterizations for only rising or falling steps.

As discussed above, characterizations capture the electrical behavior of a system and the simulation results depend on the accuracy of the characterization. Embodiments of identification process 10 may be configured to improve the characterization of non-LTI systems by passing a random bit stream and obtaining a set of impulse responses based on the previous bits automatically. This is important for non-linear systems as the entire characteristics of the system cannot be captured in a single impulse response. Embodiments described herein may then use the set of impulse responses in AMI models to perform multi-gigabit simulations to analyze system performance.

Additionally and/or alternatively, the conventional implementation does not utilize automatic extraction of impulse responses from a random bit stream. The current generation of AMI models also cannot utilize more than one impulse response at a time. This system is crucial to analyze non-LTI systems. As such, embodiments of identification process 10 may be configured to automatically extract impulse responses from a random bit stream allowing a user to obtain multiple impulse responses from a single characterization run. The impulse responses may then be used in a high throughput simulation engine such as channel simulation to perform accurate analysis.

In some embodiments, EDA application 20 and/or identification process 10 may support a variety of languages and/or standards. EDA application 20 may support one or more software extensions and may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in a non-linear system associated with an electronic circuit design comprising:
    simulating an electronic circuit design;
    identifying the non-linear system associated with the electronic circuit design;
    determining a degree of severity of non-linearity of the non-linear system associated with the electronic circuit design;
    if the degree of severity is less than a predefined threshold, receiving a random input pattern and deriving a single impulse response characterization, wherein the random input pattern is based upon, at least in part, an electronic circuit simulation associated with the electronic circuit design; and
    if the degree of severity is higher than a predefined threshold, receiving a random input stream having a plurality of patterns and deriving multiple pattern-dependent impulse response characterizations.

2. The computer-implemented method of claim 1, wherein the multiple pattern-dependent impulse response characterizations are automatically generated for all prior combinations of bits.

3. The computer-implemented method of claim 2, further comprising:
    providing the multiple pattern-dependent impulse response characterizations to one or more algorithmic modeling interface ("AMI") models associated with an electronic design application.

4. The computer-implemented method of claim 3, wherein the one or more AMI models are used with an Input/output Buffer Information Specification ("IBIS") specification compliant simulator.

5. The computer-implemented method of claim 1, further comprising:
    generating a channel simulation waveform.

6. The computer-implemented method of claim 1, wherein the random input pattern is a pseudorandom binary sequence ("PRBS").

7. A non-transitory computer-readable storage medium having stored thereon instructions that when executed by a machine result in the following operations:
    simulating an electronic circuit design;
    identifying a non-linear system associated with an electronic circuit design;
    determining a degree of severity of non-linearity of the non-linear system associated with the electronic circuit design; and
    if the degree of severity is less than a predefined threshold, receiving a random input pattern and deriving a single impulse response characterization, wherein the random input pattern is based upon, at least in part, an electronic circuit simulation associated with the electronic circuit design; and
    if the degree of severity is higher than a predefined threshold, receiving a random input stream having a plurality of patterns and deriving multiple pattern-dependent impulse response characterizations.

8. The computer-readable storage medium of claim 7, wherein the multiple pattern-dependent impulse response characterizations are automatically generated for all prior combinations of bits.

9. The computer-readable storage medium of claim 8, further comprising:
    providing the multiple pattern-dependent impulse response characterizations to one or more algorithmic modeling interface ("AMI") models associated with an electronic design application.

10. The computer-readable storage medium of claim 9, wherein the one or more AMI models are used with an Input/output Buffer Information Specification ("IBIS") specification compliant simulator.

11. The computer-readable storage medium of claim 7, further comprising:
generating a channel simulation waveform.

12. The computer-readable storage medium of claim 7, wherein the random input pattern is a pseudorandom binary sequence ("PRBS").

13. A system for use in a non-linear system associated with an electronic circuit design comprising:
a computing device configured to simulate an electronic circuit design and identify the non-linear system associated with the electronic circuit design and to determine a degree of severity of non-linearity of the non-linear system associated with the electronic circuit design, wherein if the degree of severity is less than a predefined threshold, the computing device is further configured to receive a random input pattern and derive a single impulse response characterization, wherein the random input pattern is based upon, at least in part, an electronic circuit simulation associated with the electronic circuit design and if the degree of severity is higher than a predefined threshold, the computing device is further configured to receive a random input stream having a plurality of patterns and deriving multiple pattern-dependent impulse response characterizations.

14. The system of claim 13, wherein the multiple pattern-dependent impulse response characterizations are automatically generated for all prior combinations of bits.

15. The system of claim 14, wherein the one or more processors are further configured to:
provide the multiple pattern-dependent impulse response characterizations to one or more algorithmic modeling interface ("AMI") models associated with an electronic design application.

16. The system of claim 15, wherein the one or more AMI models are used with an Input/output Buffer Information Specification ("IBIS") specification compliant simulator.

17. The system of claim 13, wherein the one or more processors are further configured to:
generate a channel simulation waveform.

* * * * *